March 5, 1963     J. J. HENDRICKSON     3,080,008
DRIVE MECHANISM FOR ROTARY IMPACT DRILL
Filed March 2, 1959     3 Sheets-Sheet 1
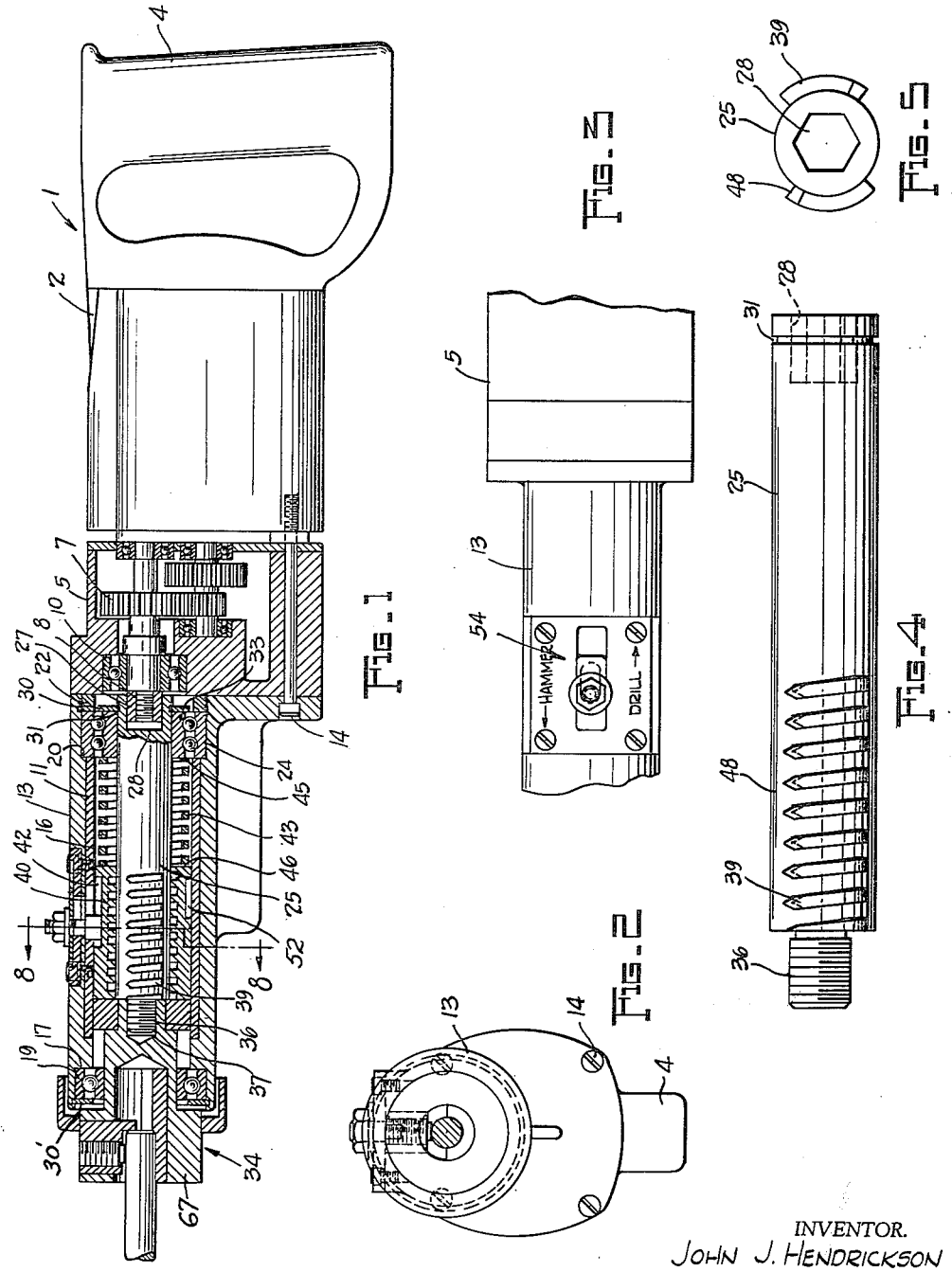
INVENTOR.
JOHN J. HENDRICKSON
BY Bosworth, Sessions,
Herrstrom + Knowles
ATTORNEYS.

March 5, 1963  J. J. HENDRICKSON  3,080,008
DRIVE MECHANISM FOR ROTARY IMPACT DRILL
Filed March 2, 1959  3 Sheets-Sheet 2
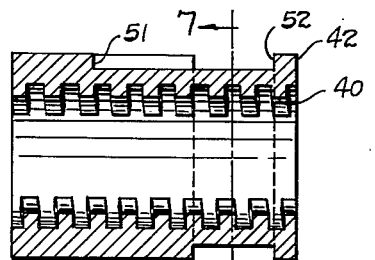
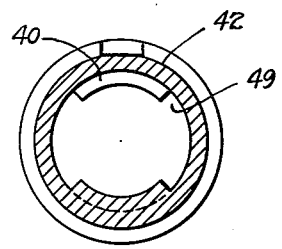
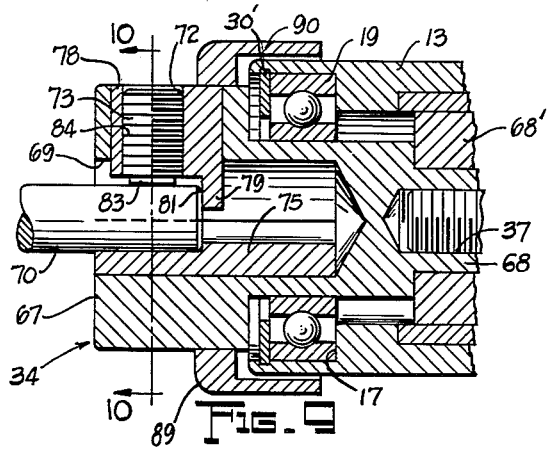
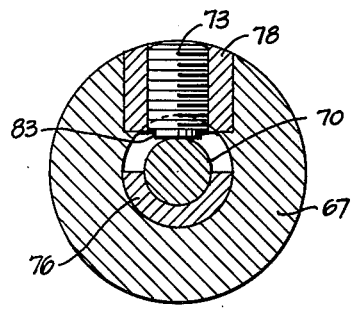
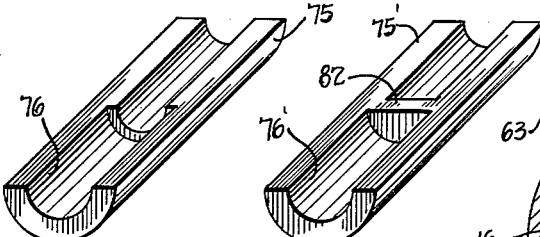
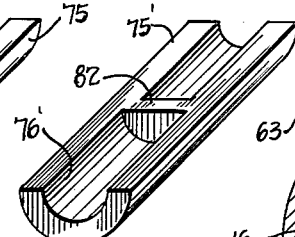
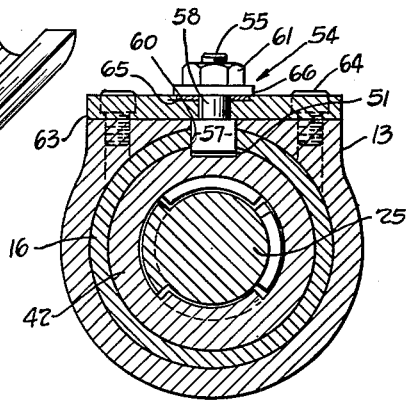
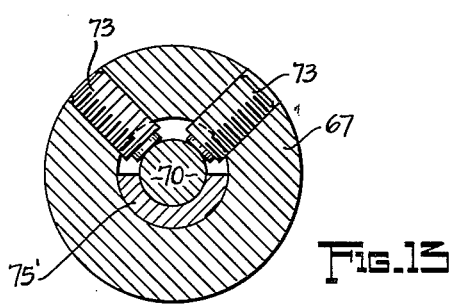
INVENTOR.
JOHN J. HENDRICKSON
BY Bosworth, Sessions,
Herrstrom & Knowles
ATTORNEYS.

March 5, 1963  J. J. HENDRICKSON  3,080,008
DRIVE MECHANISM FOR ROTARY IMPACT DRILL
Filed March 2, 1959  3 Sheets-Sheet 3

INVENTOR.
JOHN J. HENDRICKSON
BY Bosworth, Sessions,
Herrstrom + Knowles
ATTORNEYS.

United States Patent Office 3,080,008
Patented Mar. 5, 1963

3,080,008
DRIVE MECHANISM FOR ROTARY
IMPACT DRILL
John J. Hendrickson, 217 Little Mountain Road,
Mentor, Ohio
Filed Mar. 2, 1959, Ser. No. 796,643
13 Claims. (Cl. 175—133)

This invention relates broadly to means for translating rotary motion into axially reciprocable motion and more particularly to percussive tools or rotary-impact drills for drilling concrete and other masonry products and apparatus for tightly holding tools, bits and other objects which are subject to frequent and/or rapid vibration.

In the fields to which this invention relates the word "tool" has a dual meaning and is commonly used to refer to both an entire apparatus or mechanism and to the instrument or working member which is supported within the chuck of the apparatus. Accordingly, in this application, in order to obviate confusion, the entire apparatus will be referred to variously as the "apparatus," or "drill" and the instrument or working member will be referred to as the "bit" and, unless plainly inappropriate, each such word shall be construed broadly and not as a word of limitation. Thus the word "bit" includes, inter alia, any twist drill, auger, shaft or chipper used or useful with apparatus embodying all or part of this invention, and the term "drill" includes, inter alia, any percussive tool, rotary-impact drill, reciprocable hammer or other apparatus embodying all or part of one or more of the embodiments and modifications of this invention.

The general object of this invention is to provide an improved rotary-impact drill, percussive tool or the like which has greater utility, ruggedness and efficiency than prior apparatus of a similar nature.

Another object of this invention is to provide improved means for translating rotary motion into rapid, axially reciprocable motion for use, inter alia, in rotary impact drills, non-rotary impact apparatus, as a piston within a cylinder and in other applications.

Further objects of this invention include the provision of an improved rotary-impact drill, percussive tool or the like which drills concrete and other masonry products quickly and easily; which is positive and foolproof in operation; which is readily used by unskilled operators; which is economically manufactured and used; which has a long life; which is adapted for both casual and intermittent use in building and plant maintenance, the home or similar place and for substantially constant or regular use over long periods of time in production or similar applications; which holds the bit tightly throughout the drilling operation without loosening or releasing the same because of vibrations resulting from the impact action; and/or which is readily and easily selectively changed from a rotary-impact drill to a non-impacting rotary drill.

Still further objects of this invention include the provision of a rotary-impact drill, percussive tool or the like having a longitudinally displaceable operating nut or hammer which has a relatively large throw or travel and delivers a substantially maximum impact to the bit; which is lifted or displaced smoothly and evenly by engagement with a screw shaft on a plurality of longitudinally spaced surfaces thereby reducing the load on the motor while increasing the throw and linear speed of the hammer and reducing the frictional engagement between the nut and adjacent housing so as to provide a lower operating temperature than prior art devices so that the exterior of the housing remains cool enough to handle even after long periods of operation, and which has improved means for selectively changing the drill from rotary-impact to rotary motion and back again.

Another object of this invention is the provision of a selective action mechanism for selectively changing a rotary-impact drill to a rotary drill and back again which is easily used, which is simple, rugged and efficient in construction and operation, which is economically manufactured; and which does not otherwise interfere with the rotary-impact or rotary operation of the drill.

A still further object of this invention is the provision of improved means for tightly securing a bit or the like in a rotary impact drill, percussive tool, or other apparatus in which the bit is subjected to frequent and rapid vibration or impacts and holding the same in place without loosening through relative long periods of use.

Another object of this invention is the provision of an improved set screw, for holding and/or coacting with bits, shafts, and other cylindrical objects, surfaces and the like, which is easily tightened and released by the operator, and which is self-locking and remain tight and resists loosening even when the apparatus of which it is a part is subjected to rapid and frequent vibrations and/or impacts over relatively long periods of time.

Further objects of this invention include the provision of a self-locking set screw which remains tight and resists loosening even when subjected to relatively long periods of rapid and frequent vibrations, which is easily and economically manufactured and used; which is usable in current applications in lieu of present common type set screws, without otherwise modifying, changing or adapting the apparatus within which the set screw is used; which may be withdrawn and reused without damage to the threads of the set screw or of the hole within which the set screw is mounted; which has a relatively large surface engagement with the bit, shaft, or surface which is being tightened and held in place thereby; and which coacts with the bit, shaft or surface which it engages and the hole within which it is disposed to resist loosening due to vibration and the like.

Another object of this invention is the provision of improved means for tightly and securely holding bits, and the like which are subjected to rapid and frequent vibrations and/or impacts over relatively long periods of time.

Still other objects of this invention include the provision of an improved and more efficient chuck, for rotary-impact drills, percussive tools and other apparatus in which the bit is subjected to frequent and repeated vibrations and impacts, which is readily adapted for use with bits of different sizes; which is not destroyed or damaged by the vibration and impacts transmitted to or by the bit; which is usable with apparatus which also imparts a rotary motion to the bit; which is of simple rugged construction; which is economically manufactured and used; which holds the bit tightly and without loosening even when the apparatus is subjected to periods of protracted use and the bit is impacted, jarred and vibrated over relatively long periods of time; which firmly and properly supports the bits without deleteriously damaging them; which is useful with ordinary bits having ordinary shanks; and which is readily used by inexperienced and unskilled operators.

Still another object of this invention is to provide apparatus having one or more of the above objects and advantages.

The manner of obtaining these and other objects and advantages of this invention will become apparent from the following description of a preferred and modified form thereof, reference being had to the attached drawings in which:

FIGURE 1 is a view, partly in side elevation and partly in longitudinal section, of a rotary-impact drill embodying a preferred form of this invention;

FIGURE 2 is a front elevational view of the drill shown in FIGURE 1;

FIGURE 3 is a top plan view of the drill shown in FIGURE 1;

FIGURE 4 is an elevation on an enlarged scale of the screw shaft shown in the drill in FIGURE 1;

FIGURE 5 is an end view of the screw shaft shown in FIGURE 4;

FIGURE 6 is a longitudinal section on an enlarged scale of the operating nut shown in FIGURE 1;

FIGURE 7 is a transverse section viewed along the line 7—7 of FIGURE 6;

FIGURE 8 is a transverse section on an enlarged scale viewed along the line 8—8 of FIGURE 1;

FIGURE 9 is an enlarged, broken, longitudinal section of the chuck shown in FIGURE 1;

FIGURE 10 is a transverse section viewed along the line 10—10 of FIGURE 9;

FIGURE 11 is a perspective view of a preferred form of insert for the chuck shown in FIGURE 9;

FIGURE 12 is a perspective view of a modified form of insert for the chuck shown in FIGURE 9;

FIGURE 13 is a sectional view, similar to FIGURE 11, showing a modified form of chuck embodying this invention;

Figure 16:
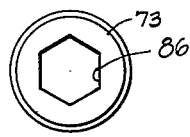
FIGURE 16 is an end view of the head of the set screw shown in FIGURE 14.

This invention will be described in connection with and in the environment of the rotary-impact drill and other apparatus shown in the drawings, however, it is to be understood that this is by way of example only and that this invention and/or parts or portions thereof may be used with other drills and apparatus and that other drills and apparatus may be adapted for use with this invention and/or parts or portions thereof.

Broadly this invention comprises improved means for providing short stroke, high speed reciprocable motion including a motor driven screw shaft, a nut adapted to coact with the shaft and to be displaced longitudinally thereby in one direction against the force of a spring and to be returned in the other direction, relative to the screw shaft, by the spring. The invention also comprises a new and improved means for tightly holding bits and the like, which are subjected to rapid and/or frequent vibration or impacts, a new and improved self-locking set screw for holding shafts and other objects subject to vibration, which effectively resist loosening and dislodgement due to vibration and an improved means coacting with the impact member and housing of a rotary-impact drill and the like for selectively changing the drill to a rotary drill.

A rotary-impact drill embodying a preferred form of this invention is illustrated, by way of example, in FIGURE 1, and indicated generally at 1. Drill 1 includes a housing 2 forming a handle 4 and enclosing an ordinary electric motor (not shown), having suitable leads (not shown) for connection to a source of electrical power. An extension 5 on the forward end of housing 2 encloses and supports a gear train, indicated generally at 7, which is driven by the motor and in turn drives a stub shaft 8 supported on suitable bearings 10. This drive mechanism, per se, forms no part of the instant invention and other drive mechanisms and types of motors using similar or other sources of power may be used in apparatus embodying this invention.

Drill 1 is adapted to both rotate and pound or impact the bit and to this end is provided with the rotary impact mechanism embodying this invention and indicated generally at 11.

Mechanism 11 is disposed within a substantially cylindrical barrel-like housing 13, which is conveniently formed of cast aluminum. Housing 13, together with housing extension 5, is mounted on housing 2 by suitable means such as screws 14. Housing 13 is preferably protected from wear due to the relatively moving parts of the mechanism 11 by means of a hardened steel insert or sleeve 16. Housing 13 is, also, preferably provided at its forward end (leftward end, as viewed) with a bearing seat 17 within which a suitable bearing 19 is disposed. The rearward end of housing 13 is preferably counterbored as at 20 to provide a seat for a thrust or other suitable bearing 24 which is held in place by spacer 22.

Mechanism 11 includes a longitudinally extending screw shaft 25, which is supported for rotary motion within housing 13 and sleeve 16 by bearing 24 and functions both to transmit rotary motion to the bit and as the actuating part of the impacting or percussive means.

Screw shaft 25 is operatively interconnected with and rotated by stub shaft 8 and is preferably adapted for limited axial or longitudinal movement relative to the stub shaft and housing 13 for purposes which will hereinafter be more fully explained. To this end an angled fitting, such as hexagonal nut 27, is mounted on shaft 8 and extends within a correspondingly shaped recess 28, see FIGURES 1, 4 and 5, which is provided in the inner end of shaft 25.

Recess 28 is of greater depth than the length of nut 27 and the relative diameters of nut 27 and recess 28 are such that screw shaft 25 has a sliding fit with the nut 27 but the nut cannot rotate within the recess without engaging and rotating the screw shaft.

Screw shaft 25 is preferably retained in position within housing 13 by means of a split ring retainer 30 which seats in an arcuate groove 31 provided in the screw shaft adjacent the inner end thereof. Retainer 30 is of sufficient size to engage and act between the screw shaft and the inner side 33 of bearing 24.

A chuck, indicated generally at 34, is mounted on the outer end, leftward end as viewed, of screw shaft 25 and is adapted to be rotated by the screw shaft. Conveniently chuck 34 is removably mounted on screw shaft 25 by means of threads 36 on screw shaft 25 and threaded recess 37 in chuck 34. Thus screw shaft 25 transmits rotary motion from stub shaft 8 to the chuck and drives the chuck.

Screw shaft 25 is also adapted to actuate the impact mechanism. Broadly, the impact mechanism is adapted to translate rotary motion into high speed, short stroke, reciprocable motion and specifically in this form of the invention the reciprocable motion is used to direct a blow or impact against the chuck and thereby the bit and object being drilled.

The impact mechanism translates the rotary motion into reciprocable motion by means of an interacting screw shaft and a piston or nut. The screw shaft is rotated by the motor of the apparatus of which it is a part and the nut 42, for example, is reciprocated by the action of the impact mechanism within the sleeve 16. The nut is engaged by the screw shaft at a plurality of longitudinally spaced points throughout the length of the nut so as to prevent cocking of the nut relative to the sleeve and consequent deleterious wear and heat due to angular frictional engagement between the nut and the sleeve and to distribute the work load on the screw shaft and motor so that relatively heavy springs and larger forces may be used to more efficiently and effectively deliver heavier and stronger impacts to the chuck and bit.

To this end screw shaft 25 is provided with screw threads 39 which engage and coact with threads 40 of nut 42, which is held against rotation in order to displace the nut in an inward direction away from chuck 34.

Nut 42 is forcefully urged toward and into engagement with chuck 34 by means of coil spring 43 and is displaced rearwardly by screw shaft 25 against the force of spring 43. Spring 43 is disposed about screw shaft 25 and acts between the outer side 45 of bearing 24 and the inner face 46 of nut 42 and is conveniently flat for longer life. Nut 42 is disposed within sleeve 16 and about screw shaft 25 and is of such external diameter relative to the interior diameter of sleeve 16 as to have a freely sliding fit therewith.

In order to provide for return of the nut 42, under the force of spring 43, against the chuck, after the nut has been displaced inwardly, rightwardly as viewed, by the screw shaft 25, the threads 39 and 40 on screw shaft 25 and nut 42, respectively, are each broken away as at 48 and 49, respectively, so as to provide alternate lengths of longitudinally aligned threads or lands and voids, see FIGURES 4, 5, and 7. When rotation of the screw shaft brings the lands of the threads 39 into engagement with the lands of threads 40, the nut is displaced inwardly. When continued rotation of screw shaft 25 brings the lands of threads 39 and 40 into respective longitudinal alignment with the voids 49 and 48 of threads 40 and 39, respectively, spring 43 acts upon nut 42 and forces the nut outwardly, leftwardly as viewed, against the chuck, the lands of threads 39 and 40 passing longitudinally along the voids 49 and 48, respectively. Threads 39 and 40 preferably comprise two arcuately spaced rows of lands and voids thereby providing for two inward displacements of nut 42 and two outward thrusts or throws of the nut against the chuck for each revolution of screw shaft 25. Further, in order to provide sufficient time for the outward axial throw or movement of nut 42 under the force of spring 43, between inward displacements of the nut by the screw shaft, while the screw shaft continues to rotate at substantially constant speed, and to ensure that the outward movement of the nut is completed before inward displacement is initiated, the voids 48 and 49 in threads 39 and 40, respectively, are each of greater arcuate length than the arcuate length of the respective lands. To ensure that a proper engagement is made between the lands of threads 39 and 40 upon each half turn of the screw shaft 25, which is also a half turn of the screw shaft relative to the nut, threads 39 and 40 are double threads. The pitch of threads 39 and 40 is preferably as large as practicable so as to provide as large a displacement of the nut by the screw shaft, as is conveniently possible, and thereby as large a throw and impact on the chuck for a given size spring. Further, nut 42 and threads 40 are of a sufficient length to provide a plurality of turns or longitudinally spaced lands of threads 49 for engagement with a plurality of turns or longitudinally spaced lands of threads 39. The plural engagement between threads 39 and 40 divides the load on the threads thereby permitting more efficient and effective inward displacement of the nut against the spring. Consequently a heavier and stronger spring 43 can be used to provide the thrust with which the nut is thrown against the chuck for a given size electric motor without unduly loading or overloading the motor. Further the plural longitudinally spaced engagement between threads 39 and 40 over substantially the entire length of nut 42 maintains the nut and screw shaft concentric. This prevents relative cocking and angular frictional engagement between the nut and sleeve 16 which would otherwise occur due to the relatively loose fit necessitated between the sleeve and nut because of the sliding engagement therebetween, and manufacturing convenience, and so prevents excessive and deleterious wear on the sleeve and heating of the sleeve, nut and housing to temperatures too hot for the user to handle.

Drill 1 is also adapted to be provided with means for selectively changing the drill from a rotary-impact drill, as described above, to an ordinary rotary drill and back again. Such means is adapted to selectively release nut 42 from the restraint against rotation set forth above so that the nut rotates with the screw shaft and is not reciprocated and impacted against the chuck by the screw shaft and spring in the manner described above.

To this end a longitudinally extending slot 51 and an intersecting arcuate groove 52, see FIGURES 6 and 7, are provided in the exterior surface of nut 42 and a selective action mechanism indicated generally at 54, see FIGURES 1, 3 and 8, and having means, such as bolt 55, which is longitudinally displaceable and is positioned within the slot 51 to engage and restrain nut 42 against rotation and is positioned within groove 52 to permit the nut to rotate freely without engaging therewith. Bolt 55 preferably has a rectangular head 57 having a width which is preferably substantially equal to the width of slot 51 so as to ensure a good positive engagement with the sides of the slot when selective action mechanism 54 is set for rotary-impact action. On the other hand, the width and length of head 57 is preferably substantially less than the width of groove 52 so that nut 42 rotates freely without engaging bolt head 57 when bolt head 57 is positioned in groove 52. In order to provide for selectively displacing bolt 55 and holding it tightly in the desired position, the shank 58 of bolt 55 extends through a longitudinally extending slot 60 which is provided in sleeve 16 and housing 13, and a nut 61 is adapted to tighten on shank 58 and against the exterior of housing 13 to hold the bolt in the desired predetermined position in the slot 51 or groove 52. When it is desired to change the action of the drill from rotary-impact to straight rotary or vice versa, nut 61 is loosened, the bolt 55 slid into the other position and the nut retightened. In changing from straight rotary to rotary-impact action the chuck may be rotated by hand, if necessary, to rotate nut 42 and bring slot 51 into alignment with bolt head 57. In order to provide for assembling selective action mechanism 54 in drill 1, slot 60 is preferably provided in a cover plate 63 which is mounted on the upper surface of housing 13 by means of screws 64. Also in order to prevent grease, etc., from escaping from the interior of housing 2 and dirt, grime and other deleterious matter from entering the housing to cover 63 and is preferably provided with a longitudinally extending slideway 65. Slideway 65 overlies slot 60 and is provided with a slide 66 which extends in both directions from bolt 55 and is adapted to cover the otherwise open portions of slot 60.

As noted above, recess 28 in screw shaft 25 is of greater depth than the length of hexagonal nut 27. This play is provided to the end that when the bit is applied to the surface of the object to be drilled, the mechanism 11 is displaced inwardly and the blows or impacts delivered to the chuck by nut 42 are directed against, imparted to and absorbed by the object or substance being drilled and not by the housing or drill itself. Thus the rotary impact mechanism is in essence floating on the object being drilled and the drill and housing are preserved against deleterious effects and vibration due to the impacts being transmitted thereto.

Chuck 34 is adapted to tightly and firmly hold bits and the like which are subjected to frequent and rapid vibration and impact and may be adapted for use in other drills and apparatus as well as in the drill 1.

Chuck 34 comprises a body member 67 which is mounted on the screw shaft 25 and supported for rotation within housing 13 and is provided with means, at the end remote from screw shaft 25, for supporting and gripping a bit or the like.

Body member 67 is mounted on screw shaft 25 by means of threaded recess 37, as described above, and is supported for rotation within housing 13 by means of bearing 19, which is held in place and against seat 17 by a second split ring retainer 30'.

The inner end of body member 67 is conveniently of reduced diameter to facilitate the assembly of the chuck in bearing 19. It is preferable however to provide a surface, on chuck 34 against which nut 42 is impacted, which is substantially of the same diameter and area as the outer end surface of nut 42 so that full even blows are delivered to the chuck. To this end the inner end of body member 67 is necked as at 68 and a hardened steel collar 68' of substantially the same length as neck 68 is disposed about neck 68 intermediate body member 67 and nut 42. Collar 68' preferably has an internal diameter at least as small as the internal diameter of nut 42 and an external diameter having a sliding fit with sleeve 16, as does nut 42.

A central longitudinal bore 69 is provided in the outer end of body member 67 for the reception of the shank 70 of a bit, for example. The wall of bore 69 is adapted to firmly support one side of shank 70 and chuck 34 includes means to tightly force the shank against the bore wall.

Accordingly, body member 67 is also provided adjacent its forward or outer end with a threaded hole 72, extending transversely through one side of the body member and intersecting bore 69 and a set screw 73 is threadably engaged within hole 72 and is adapted to engage shank 70 and force it tightly against the opposite bore wall.

More particularly the diameter of the bore 69 must be such that the centerline of the shank 70 lies along the axis of rotation of the chuck and each size more therefore can support properly only one size of shank. It is desirable, however, that a given chuck be adapted to support bits having various size shanks and accordingly bore 69 is preferably of relatively large diameter and an insert or modifying piece 75, FIGURE 11, is provided for insertion and use within the bore. Inserts 75 are adapted to modify the diameter of a predetermined bit shank 70 so that the center of the shank coincides with the axis of rotation even though the diameter of the shank is less than the diameter of the bore. Insert 75 has an external diameter equal to the diameter of bore 69 and is preferably as long as the depth of bore 69 so as to seat firmly in bore 69 and to ensure the proper alignment of the center line of the shank with the axis of rotation. Insert 75 is adapted to support one side of the shank 70 and to expose the other side for engagement with the set screw 73 and accordingly preferably has a semi-circular cross-section, as shown.

Insert 75 is provided with a longitudinally extending groove or bore 76 of desired predetermined diameter to properly support shank 70. Preferably and conveniently, as best seen in FIGURES 9 and 11, bore 76 has two different diameters, extending from either end of insert 75 toward the center thereof, so that by simply inverting insert 75, end for end, within bore 69 it is adapted for use with shanks of two different diameters. Of course more than one insert, each having different diameter bores 76, may be provided for each chuck and the chuck is thereby adapted for use with a wide range of bits, by simply changing and/or inverting the inserts 75.

Chuck 34 also preferably includes a stop for limiting the entry of shank 70 into bore 69. To this end, as best seen in FIGURES 9 and 10, body member 67 is provided with a transversely extending insert 78 having a finger or stop 79 which extends into bore 69 and has a forward face 81 against which the inner end of shank 70 seats.

Preferably and conveniently, insert 78 is disposed opposite that part of bore wall 69 which supports insert 75 and hole 72 is formed in insert 78.

Alternatively the bit stop for chuck 34 may be a land 82 extending across the bore 76' of the modified form of insert 75' shown in FIGURE 12. Insert 75' is otherwise conveniently similar to insert 75 and the use of insert 75' preferably is in lieu of providing insert 78 in chuck body member 67, albeit both stops may be provided if desired, see FIGURE 12.

In those instances where the bit is to be subjected to a prying or leverage motion as well as to impact and/or rotation or additional support is otherwise desirable for holding the bit against the bore wall or insert two holes 72 and set screws 73 may be provided as shown in FIGURE 13.

As shown in FIGURE 13, when two set screws 73 are provided they are preferably disposed with their centerlines 90° apart and 45° to either side of the longitudinal plane through the center of the insert or line of contact between the shank 70 and the insert.

Drill 1 and chuck 34 also preferably include an improved set screw 73 for holding the shank 70 in the chuck 34. Set screw 73 is self-locking and is adapted to resist accidental loosening, within hole 72, even though the bit and chuck be vibrated rapidly and frequently. A set screw 73 embodying this invention is adapted to be relatively easily tightened and loosened when desired and to function and operate without the use of special tools, shafts, threads or holes.

To this end, as best seen in FIGURES 14 through 22, set screw 73 is provided with a tip having a bearing surface, for engagement with the shaft, shank or surface to be held, which is eccentric with and engages the shaft, shank or surface to be held eccentric of the centerline of the threaded engagement between the set screw and the hole within which it is mounted.

Figure 14:
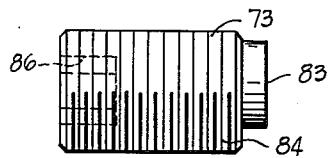
FIGURE 14 is an elevational view on an enlarged scale of the set screw shown in FIGURE 1.
Figure 15:
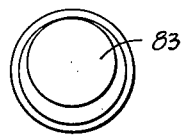
FIGURE 15 is an end view of the tip of the set screw shown in FIGURE 14.
Figure 19:
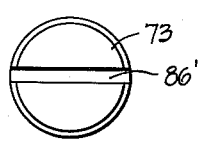
FIGURE 19 is an end view of the head of the set screw shown in FIGURE 17.
Figure 17:
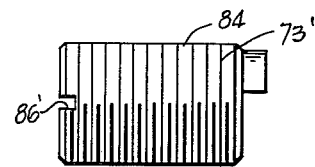
FIGURE 17 is an elevational view of a modified form of set screw embodying this invention.
Figure 18:
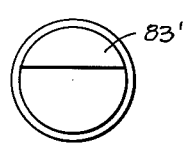
FIGURE 18 is an end view of the tip of the set screw shown in FIGURE 17.
Figure 22:
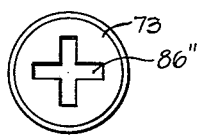
FIGURE 22 is an end view of the head of the set screw shown in FIGURE 20.
Figure 20:
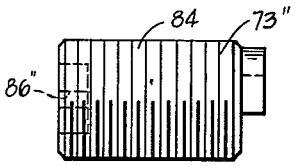
FIGURE 20 is an elevational view of another modified form of set screw embodying this invention.
Figure 21:
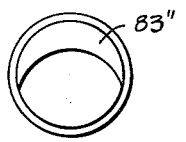
FIGURE 21 is an end view of the tip of the set screw shown in FIGURE 20.

In one form, set screw 73 is provided with a solid circular tip 83, see FIGURES 14 and 15, which is eccentric of the center line of the set screw threads 84 and a flat surface 85 adapted to engage the shaft, bit or surface to be gripped such as shank 70, for example, see FIGURES 9 and 10. Set screw 73 is also provided with a suitable and convenient head, such as hexagonal socket 86, FIGURES 14 and 16 by which it is tightened or loosened.

Tips for set screws 73 embodying this invention may take different shapes and forms as, for example, tips 83' and 83'', FIGURES 17, 18, 20 and 21, provided the set screw tips have a surface eccentric to the axis of the set screw. Set screws 73 embodying this invention may be adapted to have any desired head such as, for example, heads 86' and 86'', FIGURES 17, 19, 20 and 22. Further, any set screw and tip therefore embodying this invention may be provided with any desired form or shape of head; the examples of shapes or forms of head and use of a particular head with a particular tip, as shown, being for purposes of illustration only. Further, this invention may be adapted for use with other types and kinds of fastening and holding devices, such as, for example, nuts and cap screws.

In operation a bit is mounted in a drill embodying this invention by loosening set screw 73, inserting the shank 70 of the bit in the proper bore 76 in insert 75 and tightening the set screw against the shank. The selective action mechanism is positioned for the action desired, such as rotary-impact, and the motor turned on. The motor rotates screw shaft 25 and thereby chuck 34 and the bit, and actuates the impact mechanism as described above. When the bit is pressed against an object to be drilled the bit, chuck and mechanism 11 float within the play provided between nut 27 and the bottom of recess 28 so as to ensure that the full impact of the nut 42 is delivered upon and against the chuck and thence to the bit and work face. When and if the selective action is positioned for rotary motion only, in the manner described above, the bit is, of course, rotated without being impacted.

If desired, a dust cover 89 may be positioned over the end of housing 13 to keep debris, dust, etc., from entering the housing, especially when the drill 1 is used for drilling ceilings and other overhead objects. Dust cover 89 is conveniently press-fitted on and rotates with chuck 34 and has a flange 90 which extends over and parallel with and slightly spaced from housing 13.

A rotary-impact drill embodying this invention conveniently included acme double threads having a one-half inch lead (4 to the inch) for threads 39 and 40, a fifty-pound spring 43 and a five-ampere electric motor for driving screw shaft 25. Chuck 34 was provided with an insert 75 adapted to support a ½" shank and a 1 1/16" Carboloy bit having a ½" shank was secured therein, in the manner described above. The drill was then operated and drilled concrete to a depth of six inches in thirty seconds without difficulty and without the bit loosening or becoming disengaged from the chuck, even after repeated test drillings.

Figure 23:
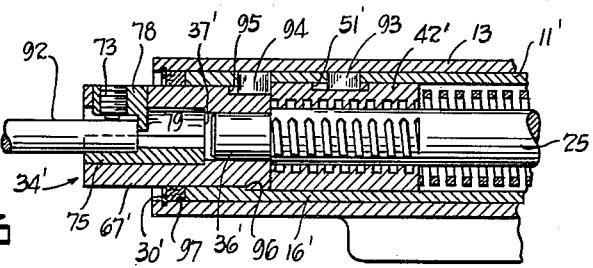
FIGURE 23 is a broken longitudinal section of apparatus embodying a modified form of this invention; and, FIGURE 24 is a broken, longitudinal section of apparatus embodying a further modified form of this invention.

As stated above, this invention is also adapted for use in other apparatus, such as, for example, chippers for chipping castings and the like, in which rotary motion is either unnecessary or undesirable. Apparatus embodying this invention and adapted to impact, but not rotate a bit, such as chipper 92 for example, is illustrated in FIGURE 23, wherein like reference characters refer to like parts. In this form of the invention chuck 34' never rotates. Accordingly, nut 42' is conveniently permanently secured against rotation by a suitable means such as a fixed pin 93 which extends into slot 51' in nut 42'. Slot 51' extends longitudinally in the surface of nut 42' and is of sufficient length to allow for the full throw or reciprocation of nut 42' without interference from or stoppage by pin 93. The width of slot 51' is substantially equal to the width of pin 93 so that the pin effectively prevents nut 42' from rotating. In order to preclude the rotation of chuck 34', body member 67' is provided with a rearwardly facing bore or recess 37' which functions as a bearing to rotatably support the outer end 36' of screw shaft 25 so that the screw shaft rotates independently of the chuck. Body member 67' has a sliding fit with sleeve 16' and is held against rotation by suitable means such as pin 94 which engages body member 67' in lateral recess 95. Chuck 34' and impact apparatus 11' are prevented from falling out of housing 13 by means of complementary interlocking lips 96 provided on body member 67' and sleeve 16'.

Recess 95 is substantially the same width as pin 94 and is of sufficient length to ensure that chuck 34' is displaceable relative to the housing in the same manner and for the same purpose as described above with respect to nut 27 and recess 28 in the preferred form of this invention. Thus chipper 92 in effect floats on the object being chipped and the full force of the impacts delivered by nut 42' are directed against the surface or object being treated.

A seal 97 is conveniently provided forwardly of sleeve 16' and about body member 67' and retaining ring 30' retains the sleeve 16' and the impact apparatus within the housing 13. Screw shaft 25 is conveniently driven in the same manner as with the preferred form of this apparatus.

In operation chipper 92, for example, is mounted within chuck 34' and the motor actuated. Screw shaft 25 rotates actuating the impact mechanism and particularly nut 42' in the manner described above and since chuck 34' is secured against rotation only, impacts or vibrations are delivered to the working end of the chipper.

Figure 24:
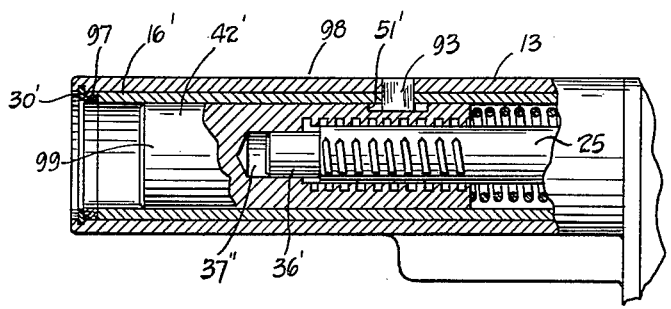

Another form of apparatus embodying this invention is illustrated in FIGURE 24, wherein like reference characters again refer to like parts, and indicated generally at 98. The apparatus 98 illustrates the use of this invention to provide rapid, short stroke reciprocable motion.

In this instance screw shaft 25 is rotated in the same manner as with the preferred form of the invention. However, in this form of the invention nut 42" extends beyond the end of screw shaft 25 and has a closed end 99 which reciprocates within sleeve 16' so that the nut functions as a piston within a cylinder.

Nut 42" is provided with a recess 37" within which the outer end of screw shaft 25 is rotatably supported. Recess 37" is of sufficient depth so that nut 42" can reciprocate relative to the screw shaft without the screw shaft bottoming within the recess.

Apparatus 98 is actuated in the same manner as drill 1. Nut 42" however is only reciprocated by the interaction of the screw shaft, nut and spring, in the manner of a piston and does not impact against a chuck or surface being worked. To this end nut 42" is secured against rotation and is retained within the sleeve 16' by fixed pin 93 which extends into slot 51' in the nut. Slot 51' is of sufficient length relative to pin 93 to permit nut 42" to reciprocate.

Changes and modifications to the preferred and modified forms of this invention herein particularly illustrated and described will occur to those skilled in the art who come to understand the principles and precepts thereof. Accordingly, the scope of this patent should not be limited to the specific forms of the invention herein specifically disclosed and described but by the advance by which the invention has promoted the art.

I claim:

1. A rotary-impact drill comprising a housing, a motor and drive train disposed within said housing, a hexagonal drive nut extending from said housing and adapted to be driven by said motor and drive train, a second housing supported on and extending forwardly from said first housing and mounted concentrically with said drive nut, a sleeve within said second housing, a threaded longitudinally extending screw shaft supported within said sleeve for rotation about a longitudinal axis coinciding with the axis of said sleeve, a hexagonal recess in the end of said screw shaft adjacent said drive nut, said drive nut extending within said hexagonal recess and engaging with said screw shaft to drive the same, said hexagonal recess having a greater axial length than the axial length of said drive nut, a chuck threadably mounted on the end of said screw shaft remote from said drive nut, inner and outer bearings mounted within said second housing and supporting said screw shaft and said chuck respectively, an impact nut having inner and outer faces and internal threads disposed about and adapted to be engaged by said screw shaft and within said sleeve, a rectangular wire spring surrounding said screw shaft and acting between said inner face of said impact nut and said inner bearing and urging said impact nut toward and into engagement with said chuck, said impact nut and said screw shaft having complementary, co-acting double-pitch acme threads, said threads on said screw shaft and said impact nut having a pair of alternate areas of longitudinally aligned lands and voids, said lands being of less than 90 degrees of arc, said threads of said screw shaft engaging said threads of said impact nut and displacing said impact nut away from said chuck against the force of said spring when said lands of said impact nut and screw shaft overlap longitudinally, said spring forcing said impact nut toward and against said chuck when said lands of said threads of said impact nut are longitudinally aligned with said voids of said threads of said screw shaft and said voids of said threads of said screw shaft are longitudinally aligned with said lands of said threads of said impact nut, means for selectively restraining said impact nut against rotation, said means including an arcuate groove and an intersecting, longitudinally extending groove in the radially outer surface of said impact nut, a longitudinally extending slot in said housing and sleeve and radially aligned with said longitudinal groove of said impact nut, a bolt having a head disposed in one said groove in said impact nut and a shank extending through said slot and outside of said housing, said longitudinal groove in said impact nut having a width substantially equal to the width of the said bolt head and said arcuate groove in said impact nut having a width greater than the width of said bolt head, said slot being of sufficient length to permit selective positioning of said bolt head in one said groove whereby said impact nut engages said bolt head and is held against rotation when said bolt head is disposed in said longitudinal groove and rotates freely without engaging said bolt head when said bolt head is disposed in said arcuate groove, said selective restraining means also comprising a flat recess in the exterior surface of said housing and surrounding said slot, a slide plate disposed in said recess and of substantially the same width as said recess and of less length than said recess by the distance said bolt head is moved between said grooves, said flat recess extending longitudinally beyond said housing slot in both directions by distance at least as great as the distance said bolt is moved between said grooves and a tightening nut for tightening the said bolt to selectively secure said bolt head in one said groove, said chuck including a body member extending outwardly beyond said second housing, and a dust cap engaging and surrounding said exposed end of the body member of said chuck and rotating therewith, said dust cap having a cylindrical flanged portion extending rearwardly and closely overlying and overlapping the end of said second housing remote from said first housing.

2. A rotary-impact drill comprising a housing, a longitudinally extending screw shaft supported within said housing for rotation about its longitudinal axis, a chuck mounted on one end of said screw shaft and adapted to rotate therewith, an impact nut disposed within said housing and about said screw shaft means to drive said screw shaft, means to selectively restrain said impact nut against rotation and a spring surrounding said screw shaft and engaging said impact nut and biasing said impact nut toward and into engagement with said chuck, said screw shaft and impact nut having complementary, interengaging, double pitched threads with alternate areas of longitudinally aligned lands and voids, said lands having less than the next adjacent voids whereby said lands of said screw shaft threads engage said lands of said impact nut threads to displace said impact nut away from said chuck against the force of said spring and said spring displaces said impact nut toward and against said chuck when said lands of said screw shaft threads are longitudinally aligned with said voids of said impact nut threads, said means for selectively restraining said impact nut against rotation, comprising intersecting arcuate and longitudinal grooves in the radially outer surface of said impact nut, a longitudinally extending slot in said housing radially aligned with said longitudinal groove of said impact nut, a bolt having a head disposed in one said groove and a shank extending through said slot and outside of said housing, said longitudinal groove in said impact nut having a width substantially equal to the width of the said bolt head and said arcuate groove in said impact nut having a width greater than the width of said bolt head, said slot being of sufficient length to permit selective positioning of said bolt head in said grooves whereby said impact nut engages said bolt head and is held against rotation when said bolt head is disposed in said longitudinal groove and rotates freely without engaging said bolt head when said bolt head is disposed in said arcuate groove, and restraining means also comprising a tightening nut for selectively securing said bolt head in one said groove.

3. A rotary-impact drill comprising a housing, a screw shaft supported within said housing for rotation about a longitudinal axis, a chuck mounted on the end of said screw shaft for rotation therewith, an impact nut surrounding and coacting with said screw shaft, a spring biasing said impact nut toward and against said chuck, means to restrain said impact nut against rotation and means to rotate said screw shaft, said impact nut and screw shaft having a plurality of mutually engaging double pitched threads, said threads on said screw shaft and impact nuts having alternate areas of longitudinally aligned lands and voids, the arcuate length of said lands being less than the arcuate length of said voids, whereby said lands of said screw shaft threads engage said lands of said impact nut threads to displace said impact nut away from said chuck and said spring displaces said nut toward and against said chuck when said lands of said screw shaft threads are longitudinally aligned with said voids of said impact nut threads.

4. The rotary-impact drill according to claim 3 in which said restraining means is adapted to selectively restrain said rotary nut against rotation and comprises an arcuate and an intersecting longitudinally extending groove in the radially outer surface of said impact nut, a longitudinally extending slot in said housing and radially aligned with said longitudinal groove of said impact nut, a bolt having a head disposed in one said groove and a shank extending into said slot, said longitudinal groove having a width substantially equal to the width of the said bolt head and said arcuate groove having a width greater than the width of said bolt head, said slot being of sufficient length to permit selective positioning of said bolt head in either said groove whereby said impact nut engages said bolt head and is held against rotation when said bolt head is disposed in said longitudinal groove and rotates freely without engaging said bolt head when said bolt head is disposed in said arcuate groove.

5. The rotary-impact drill according to claim 4 in which said slot extends through said housing and said shank extends outside said housing and said selective restraining means also comprises a flat recess in the exterior surface of said housing and surrounding said slot, a slide plate disposed in said recess and of substantially the same width as said recess and of less length than said recess by the distance between the respective positions of said bolt head in said grooves, said flat recess extending longitudinally beyond said slot in either direction by at least the distance between the respective position of said bolt head in said grooves and a tightening nut adapted to coact with said shank to tighten said bolt to selectively secure said bolt head in one said groove.

6. The rotary-impact drill according to claim 3 in which said chuck has a body member extending outwardly of said housing and said rotary-impact drill includes a dust cap mounted on said outwardly extending portion of said body member and adapted to rotate therewith and having a flange extending over and closely overlying the adjacent exterior of said housing.

7. An impact apparatus comprising a housing, a screw shaft supported within said housing for rotation about a longitudinal axis, a body member supported at one end of said screw shaft, an impact nut surrounding and coacting with said screw shaft, a spring biasing said impact nut toward and against said body member, means to restrain said impact nut against rotation and means to rotate said screw shaft, said impact nut and screw shaft having a plurality of mutually engaging double pitch threads, said threads on said screw shaft and impact nut having alternate areas of longitudinally aligned lands and voids, the arcuate length of said lands being less than the arcuate length of said voids, whereby said lands of said screw shaft threads engage said lands of said impact nut threads to displace said impact nut away from said body member and said spring displaces said nut toward and against said body member when said lands of said screw shaft threads are longitudinally aligned with said voids of said impact nut threads.

8. The impact apparatus according to claim 7 in which said apparatus includes means to restrain said body member against rotation, and said body member comprises bearing means rotatably supporting said end of said screw shaft whereby said screw shaft rotates independently of said body member.

9. The impact apparatus according to claim 8 in which said means to restrain said body member comprises a longitudinally extending slot in the exterior of the portion of said body member within said housing and pin means fixedly engaged in said housing and having an end disposed in said slot, said slot having a width substantially equal to the width of said pin means and a length greater than the length of said pin means whereby said body member may be displaced longitudinally into said housing a predetermined distance.

10. Apparatus for converting rotary motion to axially reciprocable motion, said apparatus comprising a housing, a screw shaft supported within said housing for rotation about its longitudinal axis, nut means surrounding and coacting with said screw shaft, spring means biasing said nut means in one axial direction relative to said screw shaft, means limiting the displacement of said nut means in said one direction, means restraining said nut against rotation and means to rotate said screw shaft, said nut means and screw shaft having a plurality of mutually engaging threads having alternate areas of longitudinally aligned lands and voids, whereby said lands of said screw shaft threads engage said lands of said nut means threads to displace said nut away from said one direction against the force of said spring means and said spring means displaces said nut means in said one direction when said lands of said screw shaft threads are longitudinally aligned with said voids of said nut means threads.

11. Apparatus according to claim 10 in which said nut means encloses the end of said screw shaft in said one direction and comprises bearing means supporting said one end of said screw shaft for rotation relative to said nut means and supporting said nut means for longitudinal motion relative to said one end of said screw shaft.

12. A selective action mechanism for a rotary-impact drill having a housing, a chuck, impact means having an outer surface for delivering an impact against the chuck and a drive shaft for rotating said chuck and actuating said impact means, said selective action mechanism comprising an arcuate and an intersecting longitudinally extending groove in the outer surface of said impact means, a longitudinally extending slot in said housing and radially aligned with said longitudinal groove of said impact means, bolt means having a head disposed in one said groove and being selectively slidable into the other said groove, a shank extending into said slot, said longitudinal groove having a width substantially equal to the width of the said bolt means head and said arcuate groove having a width greater than the width of said bolt head, said slot being of sufficient length to permit selective positioning of said bolt head means in one said groove whereby said impact means engages said bolt means head and is held against rotation when said bolt means head is disposed in said longitudinal groove and rotates freely without engaging said bolt means head when said bolt means head is disposed in said arcuate groove and means to releasably secure said bolt means head in one said groove.

13. The selective action mechanism according to claim 12 in which said slot extends through said housing and said bolt means shank is threaded and extends outside of said housing, said selective action mechanism includes a flat recess in the exterior surface of said housing and surrounding said slot, a slide plate disposed in said recess and of substantially the same width as said recess and of less length than said recess by the distance said bolt means head is moved between position in said grooves respectively, said recess extending longitudinally beyond said housing slot in either direction by said distance, and said releasably securing means comprises a nut adapted to coact with said shank and tighten against said housing.

References Cited in the file of this patent
UNITED STATES PATENTS

| | | |
|---|---|---|
| 464,340 | Grace | Dec. 1, 1891 |
| 1,163,712 | Upson et al. | Dec. 14, 1915 |
| 1,190,657 | Kollock et al. | July 11, 1916 |
| 1,217,815 | Payne | Feb. 27, 1917 |
| 1,428,754 | Carr | Sept. 12, 1922 |
| 1,511,566 | Kollock | Oct. 14, 1924 |
| 2,518,429 | Moorehead | Aug. 8, 1950 |
| 2,635,854 | Richards et al. | Apr. 21, 1953 |
| 2,741,924 | Tarwater | Apr. 17, 1956 |
| 2,778,648 | Benjamin et al. | Jan. 22, 1957 |